(12) United States Patent
Galioto et al.

(10) Patent No.: US 10,396,615 B2
(45) Date of Patent: Aug. 27, 2019

(54) ELECTRIC MACHINE STATOR LAMINATION WITH DUAL PHASE MAGNETIC MATERIAL

(71) Applicant: GENERAL ELECTRIC COMPANY, Schenectady, NY (US)

(72) Inventors: Steven Joseph Galioto, Waterford, NY (US); Ayman Mohamed Fawzi El-Refaie, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 609 days.

(21) Appl. No.: 14/874,583

(22) Filed: Oct. 5, 2015

(65) Prior Publication Data

US 2016/0087503 A1    Mar. 24, 2016

Related U.S. Application Data

(63) Continuation-in-part of application No. 13/780,773, filed on Feb. 28, 2013, and a continuation-in-part of application No. 13/853,122, filed on Mar. 29, 2013.

(51) Int. Cl.
*H02K 1/02* (2006.01)
*H02K 1/16* (2006.01)
(Continued)

(52) U.S. Cl.
CPC .............. *H02K 3/493* (2013.01); *H02K 1/02* (2013.01); *H02K 1/16* (2013.01); *H02K 1/2773* (2013.01);
(Continued)

(58) Field of Classification Search
CPC   H02K 1/02; H02K 1/04; H02K 3/493; H02K 1/2773; H02K 1/16; H02K 15/024;
(Continued)

(56) References Cited

U.S. PATENT DOCUMENTS 2,452,530 A * 10/1948 Snoek ..................... H01F 1/344
                                                            192/21.5
4,663,536 A   5/1987 Roesel, Jr. et al.
(Continued)

FOREIGN PATENT DOCUMENTS

CN   202395537 U   8/2012
EP   0880216 A1   11/1998
(Continued)

OTHER PUBLICATIONS

Sanada et al., Rotor Structure for Reducing Demagnetization of Magnet in a PMASynRM with Ferrite Permanent Magnet and its Characteristics, pp. 4189-4194, (IEEE 2011).
(Continued)

*Primary Examiner* — Quyen P Leung
*Assistant Examiner* — Robert E Mates
(74) *Attorney, Agent, or Firm* — Meagher Emanuel Laks Goldberg & Liao, LLP

(57) ABSTRACT

A stator lamination for an electric machine has a circular lamination with an annular bore therethrough; winding slots therethrough; and, slot closures disposed adjacent to the winding slots. The stator lamination is formed of a dual magnetic phase material, such that the magnetic property of the lamination can have a first state and a magnetic property in a second state, wherein the second state is different than the first state. The slot closures regions are treated so as to transition to the second state. A method of manufacturing an electric machine component is also disclosed.

16 Claims, 3 Drawing Sheets

(51) Int. Cl.
*H02K 3/493* (2006.01)
*H02K 1/27* (2006.01)
*H02K 15/02* (2006.01)

(52) U.S. Cl.
CPC ...... *H02K 15/024* (2013.01); *Y10T 29/49009* (2015.01)

(58) Field of Classification Search
CPC H02K 3/34; H02K 3/345; H02K 3/46; H02K 3/487; H02K 3/47; H02K 3/48; H02K 1/18; H02K 1/28
USPC .......... 310/306, 307, 216.099, 214, 44, 215
See application file for complete search history.

(56) References Cited

U.S. PATENT DOCUMENTS

| | | | |
|---|---|---|---|
| 4,713,122 A | 12/1987 | Dawes et al. | |
| 5,029,265 A | 7/1991 | Staats | |
| 5,124,607 A | 6/1992 | Rieber et al. | |
| 5,155,404 A | 10/1992 | Sadarangani | |
| 5,214,839 A | 6/1993 | Rieber et al. | |
| 5,221,139 A | 6/1993 | Belfer | |
| 5,250,867 A | 10/1993 | Gizaw | |
| 5,672,925 A | 9/1997 | Lipo et al. | |
| 5,731,666 A * | 3/1998 | Folker | H05B 41/28 315/276 |
| 6,255,005 B1 | 7/2001 | Yokoyama et al. | |
| 6,345,544 B1 | 2/2002 | Mizuno et al. | |
| 6,772,503 B1 | 8/2004 | Fathimulla et al. | |
| 7,652,404 B2 | 1/2010 | El-Refaie et al. | |
| 8,018,110 B2 | 9/2011 | Alexander et al. | |
| 8,069,555 B2 | 12/2011 | Tang et al. | |
| 8,076,811 B2 | 12/2011 | Zhu et al. | |
| 8,154,167 B2 | 4/2012 | Tang | |
| 8,319,388 B2 | 11/2012 | Yoshino et al. | |
| 8,344,581 B2 | 1/2013 | Yabe et al. | |
| 8,410,656 B2 | 4/2013 | Lokhandwalla et al. | |
| 2003/0062786 A1 | 4/2003 | Reiter, Jr. et al. | |
| 2003/0201687 A1* | 10/2003 | Asai | H02K 1/165 310/214 |
| 2004/0021396 A1 | 2/2004 | Ehrhart et al. | |
| 2005/0041432 A1 | 2/2005 | McCarthy et al. | |
| 2005/0281023 A1 | 12/2005 | Gould et al. | |
| 2007/0086131 A1* | 4/2007 | Miller | H01F 3/12 361/62 |
| 2008/0018189 A1* | 1/2008 | Dooley | H02K 1/165 310/156.01 |
| 2008/0191578 A1 | 8/2008 | Evans | |
| 2008/0238217 A1 | 10/2008 | Shah et al. | |
| 2008/0238236 A1 | 10/2008 | El-Refaie | |
| 2009/0002978 A1 | 1/2009 | Tran et al. | |
| 2010/0253174 A1 | 10/2010 | Yabe et al. | |
| 2010/0277028 A1 | 11/2010 | Alexander et al. | |
| 2012/0126652 A1 | 5/2012 | Shah et al. | |
| 2013/0002064 A1 | 1/2013 | De Bockt et al. | |
| 2013/0106500 A1* | 5/2013 | Yin | H01F 3/08 327/538 |
| 2013/0119810 A1* | 5/2013 | Aoyama | H02K 21/145 310/156.53 |
| 2014/0028145 A1 | 1/2014 | Luise et al. | |
| 2014/0239763 A1 | 8/2014 | Raminosoa et al. | |
| 2014/0246944 A1* | 9/2014 | Koka | H02K 3/28 310/211 |
| 2014/0265708 A1 | 9/2014 | Galito et al. | |
| 2015/0109080 A1* | 4/2015 | Fullerton | H01F 7/0273 335/304 |

FOREIGN PATENT DOCUMENTS

| | | | | |
|---|---|---|---|---|
| JP | H06-113493 A | | 4/1994 | |
| JP | 2002199679 A | | 7/2002 | |
| JP | 2006271058 A1 | | 9/2014 | |
| WO | 00067360 A1 | | 11/2000 | |
| WO | WO 0067360 A1 | * | 11/2000 | ............. H02K 1/165 |

OTHER PUBLICATIONS

Lavanya et al., "Performance Analysis of Three Phase Induction Motor using Different Magnetic Slot Wedges", 2014 IEEE 2nd International Conference Electrical Energy Systems (ICEES), pp. 164-167, Jan. 7-9, 2014.

U.S. Appl. No. 13/780,773, filed Feb. 28, 2013, Tsarafidy Raminosoa et al.

U.S. Appl. No. 13/853,122, filed Mar. 29, 2013, Steven Joseph et al.

European Search Report issued in connection with corresponding EP Application No. 16192202.6 dated Feb. 6, 2017.

U.S. Non-Final Office Action issued in connection with related U.S. Appl. No. 13/780,773 dated Feb. 24, 2016.

U.S. Non-Final Office Action issued in connection with related U.S. Appl. No. 13/780,773 dated Aug. 11, 2016.

U.S. Non-Final Office Action issued in connection with related U.S. Appl. No. 13/853,122 dated May 20, 2016.

S. Williamson, "Calculation of the bar resistance and leakage reactance of cage rotors with closed slots," IEEE Proceedings, vol. 132, No. 3, May 1985, pp. 125-132.

U.S. Final Office Action issued in connection with related U.S. Appl. No. 13/853,122 dated Oct. 13, 2016.

U.S. Non-Final Office Action issued in connection with related U.S. Appl. No. 13/780,773 dated Nov. 2, 2017.

* cited by examiner

ELECTRIC MACHINE STATOR LAMINATION WITH DUAL PHASE MAGNETIC MATERIAL

CROSS REFERENCE TO RELATED APPLICATIONS

This Continuation-In-Part (C.I.P.) application claims priority to the Feb. 28, 2013 filing date of U.S. application Ser. No. 13/780,773, Entitled: DUAL MAGNETIC PHASE STATOR LAMINATIONS FOR STATOR PERMANENT MAGNET ELECTRIC MACHINES. This C.I.P. application also claims priority to the Mar. 29, 2013 filing date of U.S. application Ser. No. 13/853,122, Entitled: DUAL MAGNETIC PHASE ROTOR LAMINATIONS FOR INDUCTION MACHINES which, in turn, claims priority to the Mar. 14, 2013 filing date of U.S. Provisional Application Ser. No. 61/785,020, Entitled: DUAL MAGNETIC PHASE ROTOR LAMINATIONS FOR INDUCTION MACHINES). The contents of all are incorporated herein by reference in their entirety.

GOVERNMENT LICENSE RIGHTS

The invention was made with Government support under contract number DE-EE0005573 awarded by the United States Department of Energy. The Government has certain rights in the invention.

BACKGROUND OF THE INVENTION

The present invention relates generally to electric machine components and more particularly to an electric machine stator lamination having a dual phase magnetic material.

With certain electric machine applications the machine's rotor rotates at a high tip speed. In some applications the gap between rotor and stator is filled with a gas or fluid, other than air. As a result, a large amount of mechanical loss may be created from the windage or churning of the fluid and/or gas within the air gap between the rotor and stator.

This churn in the rotor stator gap can be mitigated by providing a smooth surface on the interior core surface of the stator and/or the exterior surface of the rotor. Manufacturing challenges remain with the installation of wedges in the slot closures. The wedges lead to a non-smooth interior stator surface.

The use of slot wedges, depending on the material, may exacerbate slot leakage reactance. The lamination can be made from a continuous piece of material in which the area at the top of the slot is "closed" with magnetic lamination material. While this design provides a smoother stator bore, it leads to increased leakage reactance compared with an "open" slot design. Leakage reactance can limit the high speed power capability of electric machines. Leakage reactance can also lead to a low power factor in the electric machine.

In some electric machines the stator teeth are formed of separate components rather than a continuous, monolithic piece. The stator windings are wound around the separate teeth in a concentrated fashion and then installed into the stator to form a stator core having no slot opening remaining at the top of the slot. This method suffers from manufacturing complexity as it is limited to use with concentrated windings.

Accordingly, there is an ongoing need for improving upon electric machine componentry design, performance, and manufacturability.

BRIEF DESCRIPTION

The present invention overcomes at least some of the aforementioned drawbacks by providing an electric machine stator lamination having a dual phase magnetic material and method of manufacture. More specifically, the present invention is directed to provide a stator lamination for use in a stator of an electric machine that offers a lighter electric machine that can attain higher speed, has high efficiency, and an improved power factor with reduced volume, mass, and manufacturing cost and complexity.

In accordance with one aspect of the invention, a stator lamination for an electric machine comprises: a circular lamination having an annular bore therethrough; a plurality a winding slots therethrough; and a plurality of slot closures disposed adjacent to the plurality of winding slots, wherein the stator lamination is formed of a dual magnetic phase material, the dual magnetic phase material being having a magnetic property in a first state and a magnetic property in a second state, wherein the magnetic property in the second state is different than the first state, further wherein the plurality of slot closures is treated so as to transition to the second state.

According to another aspect of the present invention, a method of manufacturing an electric machine component, the method comprises: providing a stator lamination having an annular bore therethrough, wherein the stator lamination is formed of a dual magnetic phase material, the stator lamination including a plurality of closed winding slots disposed around the annular bore, further wherein the dual magnetic phase material having a magnetic property in a first state and a magnetic property in a second state, wherein the magnetic property in the first state is different than the second state; and converting a plurality of pre-determined locations on the stator lamination from the first state to the second state, wherein the plurality of pre-determined locations are in a region between a top of the closed winding slot and a bore edge surface of the annular bore.

Various other features and advantages of the present invention will be made apparent from the following detailed description and the drawings.

BRIEF DESCRIPTION OF THE DRAWINGS

The drawings illustrate one embodiment presently contemplated for carrying out the invention.

DETAILED DESCRIPTION

Unless defined otherwise, technical and scientific terms used herein have the same meaning as is commonly understood by one of ordinary skill in the art with respect to the presently disclosed subject matter. The terms "first", "second", and the like, as used herein do not denote any order, quantity, or importance, but rather are used to distinguish one element from another. The terms "a", "an", and "the" do not denote a limitation of quantity, but rather denote the presence of at least one of the referenced item, and the terms "front", "back", "bottom", and/or "top", unless otherwise noted, are used for convenience of description only, and are not limited to any one position or spatial orientation.

If ranges are disclosed, the endpoints of all ranges directed to the same component or property are inclusive and independently combinable (e.g., ranges of "up to about 25 wt. %," is inclusive of the endpoints and all intermediate values of the ranges of "about 5 wt. % to about 25 wt. %," etc.). The modified "about" used in connection with a quantity is inclusive of the stated value and has the meaning dictated by the context (e.g., includes the degree of error associated with measurement of the particular quantity). Accordingly, the value modified by the term "about" is not necessarily limited only to the precise value specified.

Aspects of the present invention have been shown to offer advantages over previous electric machine stator componentry design by showing performance benefit of reduced leakage reactance. Aspects provide a method of controlling the leakage inductance and Magneto-Motive Force (MMF) slot harmonics produced by the slot openings or the space between the iron teeth of the electric machine's stator. Ultimately, improvement in power capability and power factor of the electric machine has been demonstrated.

Figure 1:
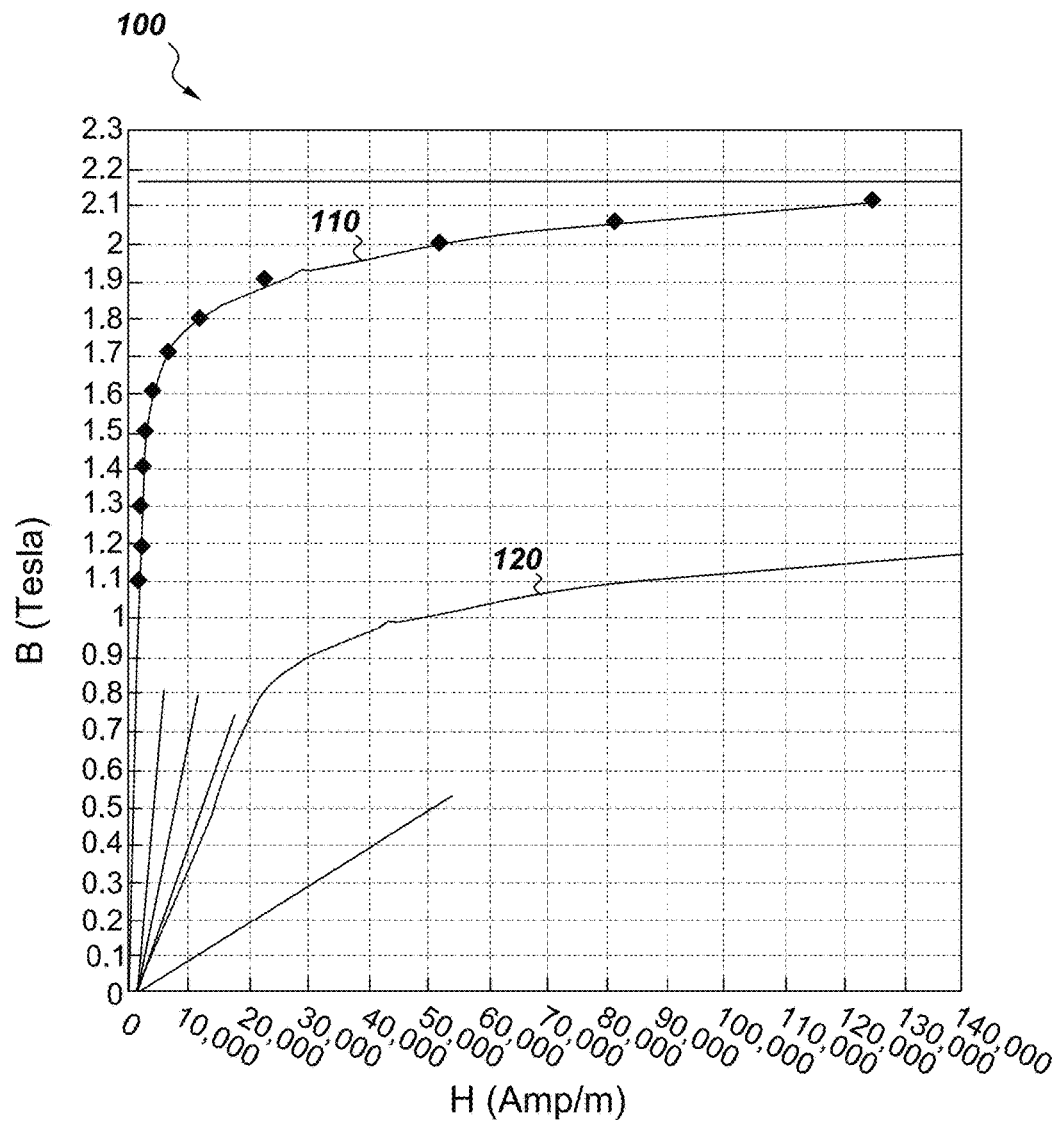
FIG. 1 is an x-y graph comparing magnetic field strength (x-axis) to flux density (y-axis) for exemplary dual phase magnetic materials.

Referring to FIG. 1, an x-y graph comparing magnetic field strength (H in amps/meter), on the x-axis, to flux density (B in tesla), on the y-axis, is depicted as 100. As illustrated, the magnetic properties of some exemplary materials are shown. As the left hand side of the graph shows, the initial permeability is the slope of the curve and can vary depending on the attributes of the material. The curve for a material asymptotically approaches saturation flux density (i.e., near horizontal). As shown the saturation flux density can happen at different levels, depending on the material's properties. Also, materials that have steeper vertical slopes (i.e., higher magnetic permeability) and higher horizontal portions (i.e., higher saturation flux density) generally are more magnetic.

Aspects of the present invention use materials that have dual magnetic phase properties. Dual magnetic phase, or dual-phase, materials include materials that go through a phase change through nitriding at high temperature and materials that go through a phase change through local heat treatment (e.g., via laser). These materials are able to undergo a change in magnetic properties from a first state to a second state, wherein the two states have different magnetic properties. That is the magnetic permeability, saturation flux density, and/or magnetism level changes from the first state to the second state. These dual magnetic phase materials have the ability to have two (or more) states co-exist in the same component. Further, the pattern or magnetic and non-magnetic (or regions of different magnetization levels) can be specified by a machine designer and "written in" to the component during manufacturing. While dual magnetic phase materials may be transitioned from substantially magnetic to substantially non-magnetic, the materials are not only 'binary' in their transitional behavior between magnetism states. That is, depending on the manner of transition, the materials can have their magnetic properties changed greatly, slightly, or any other amount.

For example, referring back to FIG. 1, the dual magnetic phase properties can be transitioned so as to move to virtually any curvature (e.g., initial permeability slope, saturation flux density, etc.) on the graph. Similarly, depending on the shape and configuration of a component made with dual magnetic phase material and the transition that the material has undergone, different locations on the component may have different magnetic properties. By example the magnetic properties of two exemplary materials are shown at 110 and 120, wherein the material at 110 is more magnetic than the material at 120. In the case of a dual magnetic phase material, by example and not limitation, the magnetic property in one (or more) region could switch from, for example, that at 110 to that at 120 by transitioning the dual magnetic phase material.

Figure 2:
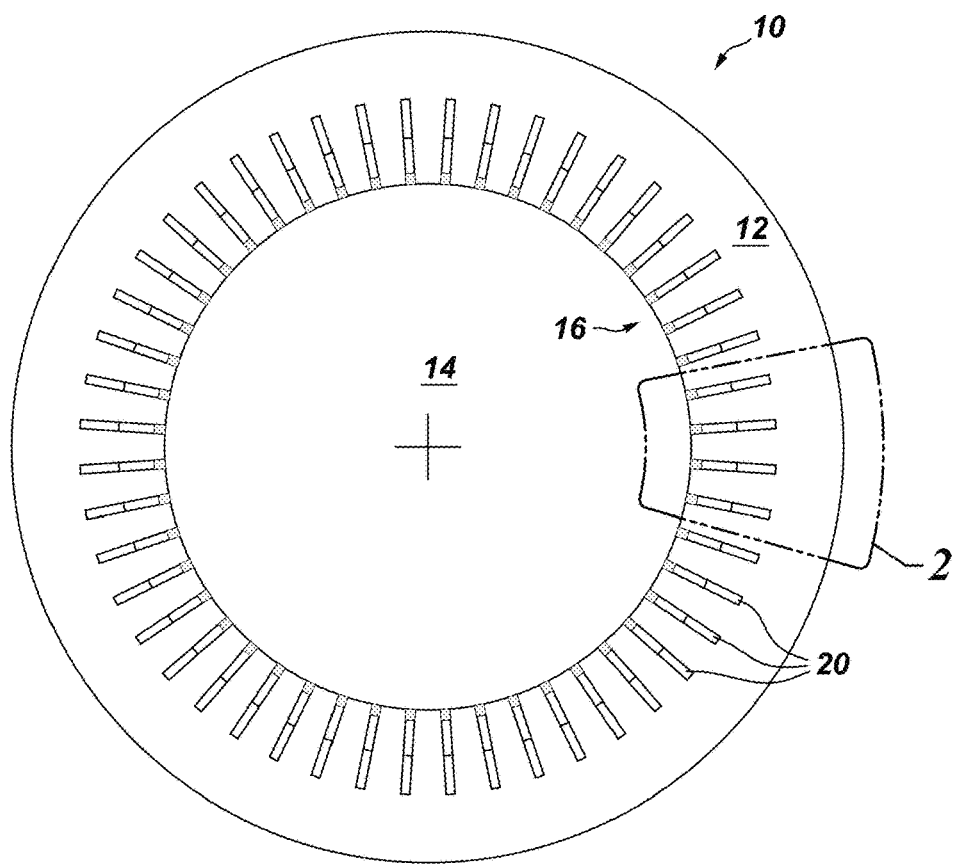
FIG. 2 is a top view of a stator lamination according to an embodiment of the present invention.

Referring now to FIG. 2, a top view of a stator lamination for an electric machine is depicted. The stator lamination, denoted with a 10, is constructed, at least in part, of a material having a dual magnetic phase property. As discussed, the dual magnetic phase material includes an ability to have magnetic properties in a first state and to have its magnetic properties transitioned to a second state that is different than the first state. The material can be transitioned to a third state, or other states, that are different too than the first state and the second state with regards to its magnetic properties. The material may be transitioned or converted via any suitable method including nitriding, heat treating, and the like.

The stator lamination 10 is configured to have an annulus bore 14 therethrough so as to define a bore edge surface 16 which is adjacent to the annulus bore 14. The lamination face 12 includes a plurality of winding slots 20 disposed around the bore 14. The stator lamination 10 is a monolithic piece made from a single piece of dual magnetic phase material.

Figure 3:
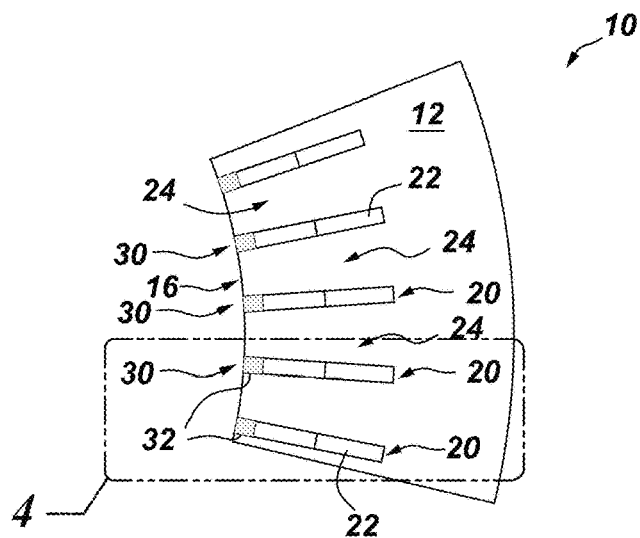
FIG. 3 is a close-up top view of a portion of the stator lamination of FIG. 2.

Referring collectively to both FIG. 2 and the close up view in FIG. 3, the winding slots 20 are closed wherein a slot closure 30 is disposed between the winding slot 20 and the bore edge surface 16. The slot closures 30 are made of the same material as the balance of the lamination face 12. Because the slot closures 30 and lamination face 12 are monolithic, there are no edges or changes in curvature in the bore edge surface 16. There is no need for wedges. Thus, the bore edge surface 16 of the lamination face 12 has a substantially smooth surface. Disposed between the winding slots are stator teeth 24. A plurality of windings 22 is disposed in the plurality of winding slots 20. The windings 22 may be any suitable type of windings including distributed windings, tooth-concentrated windings, and the like.

A pre-determined location 32 in the area of the top of the winding slot 20 and/or slot closure 30 is treated so as to convert the material to a second state from a first state, wherein the second state is different than the first state. In the second state, the pre-determined location 32 may be non-magnetic and/or less magnetic, lower magnetic permeability, and/or saturation flux density than the first state. That is the relative permeability of the pre-determined locations 32 is lower than the balance of the lamination 12 (i.e., in first state).

In embodiments, the plurality of pre-determined locations 32 may be divided into sets. That is all of the pre-determined locations 32 need not be converted in a similar manner (i.e., all converted from a first state to a second state). For example, the pre-determined locations 32 may be divided into two (or more) sets: a first set and a second set. Then, the first set of pre-determined locations 32 may be converted to a second state and the second set of pre-determined locations 32 may be converted to a third set, wherein the second state and the third state have different magnetic properties from each other and the first state. As one example of these embodiments, alternating slot closures 30 around the bore edge surface 16 could have third state properties side-by-side with slot closures 30 having second state properties.

Figure 4:
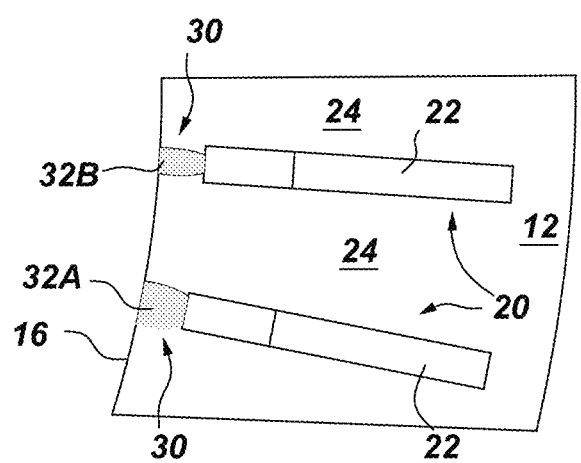
FIG. 4 is a close-up top view of a portion of the stator lamination of FIG. 3.

Referring to close up FIG. 4, two winding slots 20 are shown with windings 22 therein. As this particular embodiment depicts, the slot closure 30 region has been transformed to a second (or third) state of magnetism to be non-magnetic or less magnetic than the other portions of the lamination 12 which are in a first state of magnetism. The width of a first predetermined region 32A of one slot closure 30 is wider than the width of the winding slot 20. Conversely, the width of a second predetermined region 32B of one slot closure 30 is narrower than the width of the winding slot 20. Similarly, the magnetic property of the first predetermined region 32A may have the same magnetic property as the second predetermined region 32B (i.e., both a second state). Alternatively, the magnetic property of the first predetermined region 32A may differ from the magnetic property of the second predetermined region 32B so that their magnetic properties are a second state and third state, respectively. In still another embodiment, the magnetic property of the first predetermined region 32A may remain unchanged from the magnetic property of the balance of the lamination 12 (i.e., first state), while only the magnetic property of the second predetermined region 32B is changed to a second state. Clearly, various magnetic property changes including state, location, distribution, size, and the like may be arranged in accordance with the present invention.

A plurality of stator laminations 10 may be stacked together so as to define a stator (not shown). Similarly, a rotor (not shown) may be rotatably disposed within the stator bore 14 of the stator, thereby defining an electric machine (not shown).

Although embodiments shown in FIGS. 2-4 depict a certain slot 20 and tooth configuration, other configurations are possible. For example, the slots may be parallel or non-parallel. Similarly, the stator teeth may be parallel or non-parallel.

The embodiments illustrated and described herein may be used for a variety of electric machine types. For example, electric machines that can benefit include permanent magnet (PM), switched reluctance machine (SRM), synchronous reluctance machine, induction machine (IM), wound field synchronous machine, and the like.

Therefore, according to one embodiment of the present invention, a stator lamination for an electric machine comprises: a circular lamination having an annular bore therethrough; a plurality a winding slots therethrough; and a plurality of slot closures disposed adjacent to the plurality of winding slots, wherein the stator lamination is formed of a dual magnetic phase material, the dual magnetic phase material being having a magnetic property in a first state and a magnetic property in a second state, wherein the magnetic property in the second state is different than the first state, further wherein the plurality of slot closures is treated so as to transition to the second state.

According to another embodiment of the present invention, a method of manufacturing an electric machine component, the method comprises: providing a stator lamination having an annular bore therethrough, wherein the stator lamination is formed of a dual magnetic phase material, the stator lamination including a plurality of closed winding slots disposed around the annular bore, further wherein the dual magnetic phase material having a magnetic property in a first state and a magnetic property in a second state, wherein the magnetic property in the first state is different than the second state; and converting a plurality of predetermined locations on the stator lamination from the first state to the second state, wherein the plurality of predetermined locations are in a region between a top of the closed winding slot and a bore edge surface of the annular bore.

The present invention has been described in terms of the preferred embodiment, and it is recognized that equivalents, alternatives, and modifications, aside from those expressly stated, are possible and within the scope of the appending claims.

What is claimed is:

1. A stator lamination for an electric machine comprising:
a circular lamination having an annular bore therethrough;
a plurality of winding slots disposed around the annular bore; and
a first and a second plurality of slot closures disposed adjacent to the plurality of winding slots, the first and second plurality of slot closures alternating around the annular bore;
the circular lamination being formed of a multi-magnetic phase material having a first magnetic permeability, a second magnetic permeability, and a third magnetic permeability;
the third magnetic permeability being less than the second magnetic permeability and the second magnetic permeability being less than the first magnetic permeability;
the first plurality of slot closures having the second magnetic permeability, the second plurality of slot closures having the third magnetic permeability, and the circular lamination having the first magnetic permeability.

2. The stator lamination of claim 1, wherein the annular bore comprises a bore edge surface that is substantially smooth.

3. The stator lamination of claim 1, wherein the second magnetic permeability and third magnetic permeability are converted by nitriding.

4. The stator lamination of claim 1, wherein the second magnetic permeability and third magnetic permeability are converted by heat treating.

5. The stator lamination of claim 1, wherein the stator lamination is a monolithic piece made from a single piece of dual magnetic phase material.

6. The stator lamination of claim 1, wherein a width of the first plurality of slot closures is wider than a width of the plurality of winding slots.

7. The stator lamination of claim 1, wherein a width of the second plurality of slot closures is narrower than a width of the plurality of winding slots.

8. An assembly comprising:
a plurality of the stator laminations of claim 1 stacked together to define a stator;
a plurality of windings disposed in the plurality of winding slots; and
a rotor disposed within the stator.

9. The assembly of claim 8, wherein the plurality of windings are one of distributed windings and tooth-concentrated windings.

10. A stator lamination for an electric machine comprising:
a circular lamination having an annular bore therethrough;
a plurality of winding slots disposed around the annular bore; and a first and a second plurality of slot closures disposed adjacent to the plurality of winding slots, the first and second plurality of slot closures alternating around the annular bore;

the circular lamination being formed of a multi-magnetic phase material having a first saturation flux density, a second saturation flux density, and a third saturation flux density;

the third saturation flux density being less than the second saturation flux density and the second saturation flux density being less than the first saturation flux density;

the first plurality of slot closures having the second saturation flux density, the second plurality of slot closures having the third saturation flux density, and the circular lamination having the first saturation flux density.

11. The stator lamination of claim 10, wherein the annular bore comprises a bore edge surface that is substantially smooth.

12. The stator lamination of claim 10, wherein the second saturation flux density and third saturation flux density are converted by nitriding.

13. The stator lamination of claim 10, wherein the second saturation flux density and third saturation flux density are converted by heat treating.

14. The stator lamination of claim 10, wherein the stator lamination is a monolithic piece made from a single piece of dual magnetic phase material.

15. The stator lamination of claim 10, wherein a width of the first plurality of slot closures is wider than a width of the plurality of winding slots.

16. The stator lamination of claim 10, wherein a width of the second plurality of slot closures is narrower than a width of the plurality of winding slots.

* * * * *